United States Patent Office 2,970,982
Patented Feb. 7, 1961

2,970,982

DIORGANOPOLYSILOXANES OF LOW VOLATILITY CHAIN-STOPPED WITH A TERTIARY ALKYL PEROXY GROUP

Ben A. Bluestein, Schenectady, N.Y., assignor to General Electric Company, a corporation of New York No Drawing. Filed Sept. 16, 1957, Ser. No. 683,964

7 Claims. (Cl. 260—46.5)

This invention relates to organoperoxy compounds and to organopolysiloxane materials cured therewith. More particularly, it relates to silicone peroxides or organosiloxane materials chain-stopped with organoperoxy groups, and to vinyl-containing organopolysiloxane materials cured with such materials.

Compositions of matter comprising cured, solid, elastic, silicon-bonded, vinyl-containing organopolysiloxanes or silicone rubbers are widely used in high temperature resistant applications. These materials and their method of preparation are well known, being described for example in Marsden Patent 2,445,794, assigned to the same assignee as this invention. The above patent discloses the use of benzoyl peroxide as a curing agent for converting to the solid, elastic state, alkyl and vinyl-substituted, curable organopolysiloxanes. Benzoyl peroxide, as well as other similar materials, is very useful as a curing agent for silicone rubbers. These materials are in general characterized by a relatively high volatility, and many of them in decomposing produce acids which are deleterious to the silicone materials with which they are used. The use of curing agents which do not volatilize readily is particularly important in cloth coating applications, in which the silicone compounds are solvent dispersed. It is also desirable that the curing agent in decomposing produce materials which are not harmful to the desired properties of the silicone which they are used to cure.

An object of the invention is to provide new and useful silicone peroxide or organoperoxy compounds.

A further object of the invention is to provide new organopolysiloxane products embodying such silicone peroxide compounds as a curing agent.

Briefly, this invention relates to new silicone peroxide compounds which have a relatively low volatility and which upon decomposing with heat produce alcohol type materials which are not harmful to silicones, and to organopolysiloxane compositions cured therewith, such organopolysiloxane materials having from 1.95 to 2.01, preferably from 1.98 to 2.01, organic groups per silicon atom, from 0.05 to 2.0 mol percent silicon-bonded vinyl groups, the silicone peroxide being used in the amount of from about 0.5 to 3 parts and preferably from about 1 to 2 parts, by weight, per one hundred parts, by weight, of the silicone.

In general, the organoperoxy group compounds of this invention conform to the following general formula:

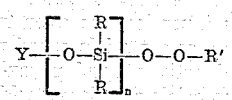

where R is an alkyl, preferably a lower alkyl group such as methyl, ethyl, propyl, butyl, etc., or an aryl group such as phenyl, benzyl, tolyl, halogenated aryl such as chlorophenyl, etc. or mixtures thereof; n is an integer greater than 1; R' is a tertiary alkyl preferably a lower tertiary alkyl group such as tertiary butyl or other tertiary alkyl groups such as tertiary amyl, tertiary hexyl, etc., and Y is hydrogen or an alkoxy preferably a lower alkoxy group OR', where R' is the same as above.

The following examples will illustrate the preparation of the new silicone peroxide compounds described herein and are offered merely as an indication of several of many ways in which such materials may be prepared.

EXAMPLE 1

Dimethyldichlorosilane was dissolved in the amount of 10 grams in 30 cc. of dry pyridine. To this solution there was added slowly 5 cc. of tertiary butyl hydroperoxide, resulting in the immediate precipitation of a white solid with the evolution of some heat. A mixture of ice and water in the amount of 200 grams was carefully added to this solution. The mixture was then saturated with sodium chloride and the organic layer washed three times with water saturated with salt, leaving about 11 grams of an oily material which reacted with potassium iodide solutions to liberate iodine. The material conformed to the following formula:

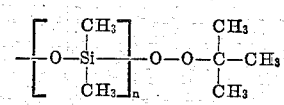

EXAMPLE 2

Diphenyldichlorosilane was added in the amount of 25 g. to 30 cc. of dry pyridine. Five cc. of tertiary butyl hydroperoxide were added to this solution slowly with stirring, resulting in the precipitation of a white solid, to which first ice was added slowly and then an excess of water, resulting in the appearance of a viscous heavy liquid. This liquid was washed six times with 100 cc. portions of water and air dried for several days to produce a pasty semisolid material, which liberated iodine when treated with potassium iodide. This, in conjunction with infrared analysis, showed that the material conformed to the following formula:

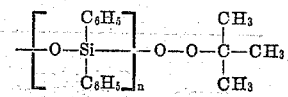

The convertible or curable silicone compositions which are advantageously cured with the silicone peroxides of this invention may be highly viscous masses or gummy elastic solids, depending upon their state of condensation, the condensing agent used, the starting organopolysiloxane employed, etc., and are generally herein referred to as convertible organopolysiloxanes or convertible vinyl organopolysiloxanes. Although convertible organopolysiloxanes in general are well known, attention is directed to the convertible organopolysiloxanes disclosed and claimed in Wright et al. Patent 2,448,565, Agens Patent 2,448,756, Krieble et al. Patent 2,457,688, Sprung Patent 2,448,556, Sprung Patent 2,484,595 and Marsden Patent 2,521,528, all assigned to the same assignee as the present invention, and to Hyde Patent 2,490,357, Warrick Patent 2,541,137 and Warrick Patent 2,494,920. Such patents are to be considered in connection with patents such as above cited Patent 2,445,795 which teach the preparation of vinyl-containing organopolysiloxanes.

The convertible vinyl organopolysiloxane compositions of the invention are derived in well-known manner from various organosiloxanes having a ratio of about 1.95 to 2.1 organic groups per silicon atom. While preferably the alkyl group is methyl, it may be other lower alkyl groups, e.g., ethyl, propyl, butyl, etc. Likewise, aryl groups may be included, such as phenyl, xylyl, benzyl, tolyl, chlorophenyl, etc. Although I prefer from the point of view of convenience and availability of material to prepare my convertible vinyl organopolysiloxanes from various tetramers, I can as well prepare them from trimers, pentamers, hexamers, and the like.

Preferably, the vinyl organopolysiloxane convertible to the cured, solid, elastic state contains from 0.05 to 2.0 mol percent vinyl groups, from 75 to 99.95 mol percent alkyl groups, preferably lower alkyl groups such as methyl and ethyl groups, and from about 0 to 25 mol percent aryl groups, the total molar concentration equally 100 percent, all the foregoing organic radicals being attached to silicon by carbon-silicon linkages. Advantageously, the silicon atoms of the vinyl organopolysiloxane contain organic radicals, at least 75 percent, and preferably more than 90 percent of which are lower alkyl radicals in the form of, for instance, $R_2SiO$, where R is a lower alkyl radical.

The convertible vinyl organopolysiloxane can be made in any of a number of ways, and the following is exemplary of such methods, all parts being by weight. Octamethylcyclotetrasiloxane in the amount of 100 parts is mixed with 15 parts of octaphenylcyclotetrasiloxane and heated to about 130° C. Thereafter, 0.23 part 1,3,5,7-tetramethyl-1,3,5,7-tetravinylcyclotetrasiloxane is added to the mixture with about 0.01 percent, by weight, KOH based on the total weight of the organopolysiloxanes, and the mixture heated for about 5 hours with stirring at 165° C. to 175° C. The KOH is neutralized with trichloroethylphosphite at 175° C. and devolatilized to produce a convertible methyl phenyl vinyl polysiloxane containing an average of about 2 organic groups to each silicon atom and about 0.2 mol percent of vinyl groups. In the preparation of another such material containing only alkyl groups in addition to vinyl groups, 100 parts of octamethylcyclotetrasiloxane and 0.23 part 1,3,5,7-tetramethyl-1,3,5,7-tetravinylcyclotetrasiloxane are condensed using 0.01 percent by weight KOH, based on the total weight of the organopolysiloxanes, and the mixture again heated for about 5 hours with stirring at 165° C. to 175° C., the KOH being again neutralized as with trichloroethylphosphite and devolatilized to produce a methyl vinyl silicone containing about 0.2 mol percent vinyl groups.

It will be realized, of course, that the various constituents described above, as well as others which are equivalent thereto, may be varied in an amount to give varying characteristics. The temperature at which the reaction is carried out can also be varied, e.g., from about 140° C. to about 180° C. and the time of reaction from about 1½ to 5 hours, depending upon the temperature, ingredients used, the type of product desired, etc. The condensing agent can also be varied and includes, besides potassium hydroxide, sodium hydroxide, ferric chloride hexahydrate, phenylphosphoryl chloride, etc.

The convertible vinyl organopolysiloxanes described herein can be compounded in an ordinary rubber compounding mill, in a dough mixer or in a Banbury mixer with various fillers, for example finely divided silicas, silica aerogel, finely divided fumed silica, etc., titanium dioxide, calcium silicate, ferric oxide, chromic oxide, cadmium sulfide, asbestos, glass fibers, calcium carbonate, carbon black, lithopone, talc, etc., and then molded, extruded, cast or otherwise shaped, as by heating under pressure, to form products having desirable physical characteristics such as elasticity, compressibility, etc., similar to those of natural rubber and other synthetic rubbers. Alternatively, solutions or dispersions of the convertible vinyl organopolysiloxane with or without filler and containing the silicone peroxide curing agent may be prepared for coating and impregnating purposes. Among such inert solvents or dispersing media may be mentioned toluene, xylene, benzene, chlorobenzene, etc., which are preferably used in conjunction with a polar solvent, including alkyl alcohols, ketones, etc., such solutions or dispersions comprising from about 10 to 50 percent solids content, considering as solids all the material in the solution or dispersion other than the liquid solvent or dispersing medium. Generally speaking, the convertible vinyl organopolysiloxanes of this invention are prepared by mixing on rubber mill rolls, in a dough mixer, etc. 100 parts, by weight, vinyl organopolysiloxane gum, from about 40 to 70 parts, by weight, of filler, and about 4 parts, by weight of diphenylsilanediol.

To 100 parts, by weight, of methyl vinyl gum having a vinyl content of 0.2 mol percent were added 40 parts, by weight, of finely divided silica and 4 parts, by weight, of diphenylsilanediol. The materials were milled or mixed to a homogeneous mass, the diphenylsilanediol being used as a structure-reducing agent as described in copending application Serial No. 399,148, filed December 8, 1953, and assigned to the same assignee as this invention. There were then milled with 30-gram portions of this master batch the amounts of silicone peroxide curing agent shown in Table I below, until a homogeneous mixture was obtained. The material with curing agent added was then press-cured for 20 minutes at 100 lb. steam pressure, with the properties shown in the table resulting after the various oven cures indicated.

*Table I*

| Example | Curing Agent (grams/100 g. of siloxane) | 150° C., 16-hr. cure | | | Tensile Product | 250° C., 20-hr. Cure | | | Tensile Product |
|---|---|---|---|---|---|---|---|---|---|
| | | Hardness (Shore A) | Tensile Strength lb./sq. in. | Elong., Percent | | Hardness (Shore A) | Tensile Strength lb./sq. in. | Elong., Percent | |
| 3 | 1.0 g. t-butyl perbenzoate | 71 | 950 | 310 | $3 \times 10^5$ | 72 | 690 | 230 | $1.6 \times 10^5$ |
| 4 | 1.0 g. di-butyl peroxide | 66 | 1040 | 390 | $4.1 \times 10^5$ | 72 | 800 | 250 | $2 \times 10^5$ |
| 5 | 1.0 g. silicone peroxide of Ex. 1 | 37 | 1100 | 680 | $7.5 \times 10^5$ | 46 | 850 | 540 | $4.7 \times 10^5$ |
| 6 | 2.0 g. silicone peroxide of Ex. 1 | 42 | 1250 | 650 | $8.1 \times 10^5$ | 47 | 930 | 500 | $4.65 \times 10^5$ |

From Table I, it will be noted that the tensile product and elongation of materials cured with the silicone peroxides of this invention are over two times as high, generally speaking, as materials cured with tertiary butyl perbenzoate or ditertiary butyl peroxide. The silicone peroxide cured materials are also considerably softer than the regularly cured materials.

Shown in Table II below are further examples prepared as above, illustrating the use of the silicone peroxides as curing agents for silicone material.

Table II

| Example | Curing Agent (g./100 g. Siloxane) | 150° C. 16 hr.; 250° C. 24 hr. Cure | | | Tensile Product |
| --- | --- | --- | --- | --- | --- |
| | | Hardness (ShoreA) | Tensile strength, lb./sq. in. | Elongation, Percent | |
| 7 | 1.0 g. t-butyl hydrogen peroxide | 39 | 910 | 440 | 4×10⁵ |
| 8 | 1.0 g. silicone peroxide of Ex. 1 | 21 | 470 | 740 | 3.5×10⁵ |
| 9 | 2.0 g. silicone peroxide of Ex. 1 | 20 | 530 | 870 | 4.6×10⁵ |
| 10 | 4.0 g. silicone peroxide of Ex. 1 | 16 | 150 | 690 | 1.0×10⁵ |

Again from Table II, it will be noted the silicone peroxide cured materials are relatively softer and particularly suitable where a cushioning effect is desired. It will be noted also that adding too much silicone peroxide degrades the tensile product of the cured silicone. Good rsults are obtained when from about 0.5 to 3 parts, by weight, of silicone peroxide are used per one hundred parts, by weight, of vinyl siloxane in the material to be cured. Preferably 1 to 2 parts, by weight, of the silicone are used per one hundred parts, by weight, of silicone. It will be seen that the silicone peroxide curing agent also substantially improves the elongation characteristic of the finished product.

There were mixed together 150 grams of the above-mentioned dimethyl silicone gum containing 0.2% vinyl siloxane, 60 grams of finely divided silica and 6 grams of diphenylsilanediol.

To the above material there were added curing agents as indicated in Table III below, the curing agent being milled into the material, after which it was press cured for 20 minutes at 100 lb. steam pressure, and then oven cured as shown.

Table III

| Example | Curing Agent (g./100 g. of siloxane) | 150°C., 16-hr. cure | | | Tensile Product | 250° C., 20-hr. cure | | | Tensile Product |
| --- | --- | --- | --- | --- | --- | --- | --- | --- | --- |
| | | Hardness (Shore A) | Tensile Strength lb./sq. in. | Elong., Percent | | Hardness (Shore A) | Tensile Strength lb./sq. in. | Elong., Percent | |
| 11 | .75 g. benzoyl peroxide in silicone | 49 | 1180 | 520 | 6.1×10⁵ | 51 | 690 | 400 | 2.8×10⁵ |
| 12 | 3.0 g. silicone peroxide of Ex. 2 | 34 | 1190 | 790 | 9.4×10⁵ | 35 | 680 | 500 | 3.4×10⁵ |
| 13 | 7.5 g. silicone peroxide of Ex. 2 | 42 | 1160 | 720 | 8.35×10⁵ | 42 | 680 | 410 | 2.8×10⁵ |

Again from Table III it will be noted that when the silicone peroxide is used within the range stated, the tensile product is improved over regular peroxide curing agents and that the resultant materials is also softer. Table III also shows that the tensile product is lowered when more than the stated amount of silicone peroxide is used.

There are provided by this invention new silicone peroxide materials which are useful in the curing of siloxane materials. Because they are generally less volatile than curing agents known heretofore, siloxanes cured therewith are characterized by better heat aging qualities. While many of the usual curing agents such as benzoyl peroxide and the perbenzoates produce upon decomposition organic acids which are harmful to the siloxane which they are used to cure, the present silicone peroxides in decomposing give rise to alcohols which are not deleterious and give improved physical qualities, when used in the range of from about 0.5 to 3 and preferably from about 1 to 2 parts, by weight, per hundred parts, by weight, of the siloxane in the material to be cured.

The cured materials of the invention are useful for fabricating tapes, gaskets, tubing, electrical insulation, coatings, shock absorbers, sleeving, etc., and are particularly useful where resistance to high temperatures is required. The invention is also useful in the coating of cloth with silicone type materials wherein the silicone is dispersed in a solvent. Since the silicone peroxides described herein are not readily volatile, they remain in place to perform their curing function even when the solvent is removed.

What I claim as new and desire to secure by Letters Patent of the United States is:

1. A diorganopolysiloxane of low volatility in which the organo groups are members selected from the class consisting of alkyl and aryl groups, said diorganopolysiloxane being chain-stopped with a tertiary alkyl peroxy group.

2. An oily diorganopolysiloxane of low volatility in which the organo groups are members selected from the class consisting of alkyl and aryl groups, said diorganopolysiloxane being chain-stopped with a tertiary alkyl peroxy group.

3. A semisolid diorganopolysiloxane of low volatility in which the organo groups are members selected from the class consisting of alkyl and aryl groups, said diorganopolysiloxane being chain-stopped with a tertiary alkyl peroxy group.

4. An oily dimethylpolysiloxane of low volatility chain-stopped with a tertiary-butyl peroxy group.

5. A semisolid diphenylpolysiloxane of low volatility chain-stopped with a tertiary-butyl peroxy group.

6. A process for preparing a diorganopolysiloxane of low volatility chain-stopped with a tertiary alkyl peroxy group, which process comprises mixing a diorganodihalogenosilane and a tertiary alkyl hydroperoxide, adding water to the resulting reaction product to form a hydrolysis mixture, and separating the resulting hydrolyzate as a separate phase from said hydrolysis mixture, the organo groups of said diorganopolysilxane and said diorganodihalogenosilane being selected from the class consisting of alkyl and aryl groups.

7. A composition of matter comprising (1) a curable organopolysiloxane having an average of from 1.95 to 2.01 organo groups per silicon atom attached to silicon through carbon-silicon linkages, from 0.05 to 2.0 mol percent of said organo groups being vinyl groups, the remainder of said organo groups being members selected from the class consisting of alkyl and aryl groups, (2) from about 0.5 to 3 parts by weight per 100 parts of said organopolysiloxane of a diorganopolysiloxane of low volatility in which the organo groups are members selected from the class consisting of alkyl and aryl groups, said diorganopolysiloxane being chain-stopped with a tertiary alkyl peroxy group, and (3) a filler.

References Cited in the file of this patent

UNITED STATES PATENTS 2,692,887    Berry  ---------------- Oct. 26, 1954

OTHER REFERENCES

Jenkner: Zeitschrift für Naturforschung, vol. 11B, (1956), pp. 757 and 606.

Buncel et al.: Chemical and Industry, No. 39, October 6, 1956, pp. 1052–1053.